US009579957B2

(12) United States Patent
Park et al.

(10) Patent No.: US 9,579,957 B2
(45) Date of Patent: Feb. 28, 2017

(54) ELECTRIC POWER TRANSMISSION APPARATUS OF SUNROOF FOR VEHICLE

(71) Applicants: Hyundai Motor Company, Seoul (KR); Kia Motors Corporation, Seoul (KR); Webasto Donghee Holdings Co., Ltd., Ulsan (KR)

(72) Inventors: Hoo-Sang Park, Hwaseong-si (KR); Yeon-Soo Eo, Chuncheon-si (KR); Sang-Hak Kim, Seoul (KR); Moon-Jung Eo, Suwan-si (KR); Su-Yun Choi, Ulsan (KR)

(73) Assignees: Hyundai Motor Company, Seoul (KR); Kia Motors Corporation, Seoul (KR); Webasto Donghee Holdings Co., Ltd., Ulsan (KR)

( * ) Notice: Subject to any disclaimer, the term of this patent is extended or adjusted under 35 U.S.C. 154(b) by 0 days.

(21) Appl. No.: 14/935,205

(22) Filed: Nov. 6, 2015

(65) Prior Publication Data

US 2017/0001498 A1    Jan. 5, 2017

(30) Foreign Application Priority Data

Jul. 2, 2015    (KR) ........................ 10-2015-0094836

(51) Int. Cl.
  *B60J 7/043* (2006.01)
  *B60J 7/057* (2006.01)
(52) U.S. Cl.
  CPC ............. *B60J 7/0573* (2013.01); *B60J 7/043* (2013.01)
(58) Field of Classification Search
  CPC ..... B60J 7/057; B60J 7/43; B60J 7/043; B60J 7/00; B60J 7/05; B60J 7/053

USPC ............ 296/211, 216.01–224; 136/244, 291
  See application file for complete search history.

(56) References Cited

U.S. PATENT DOCUMENTS

| 4,934,753 A | * | 6/1990 | Gajewski | ............... B60J 7/0573 296/211 |
| 5,154,481 A | * | 10/1992 | Paetz | ................. B60H 1/00428 136/251 |
| 5,261,722 A | * | 11/1993 | Staley | ........................ B60J 7/02 296/211 |

(Continued)

FOREIGN PATENT DOCUMENTS

| JP | 1-282021 A | 11/1989 |
| JP | 2675331 B2 | 11/1997 |

(Continued)

*Primary Examiner* — Dennis H Pedder
(74) *Attorney, Agent, or Firm* — Morgan, Lewis & Bockius LLP

(57) ABSTRACT

An electric power transmission apparatus of a sunroof for a vehicle may include a moving glass mounted with an electric generator, and configured to slide between an opened position and a closed position, an upper electric conduction device coupled at a lower side of the moving glass, and including a moving spring that is electrically connected with the electric generator and coupled to protrude downward, a front electric conduction device including a front support portion that is a nonconductor, and a close spring that comes into contact with the moving spring when the moving glass moves to the closed position, and a rear electric conduction device including a rear support portion that is a nonconductor, and an open spring that comes into contact with the moving spring when the moving glass moves to the opened position.

6 Claims, 8 Drawing Sheets

(56) References Cited

U.S. PATENT DOCUMENTS

| | | | | |
|---|---|---|---|---|
| 6,155,635 A | * | 12/2000 | Wecker | ................... B60J 7/003 296/211 |
| 6,423,894 B1 | * | 7/2002 | Patz | ........................ B60J 7/00 136/244 |
| 8,348,336 B2 | | 1/2013 | De Bie | |

FOREIGN PATENT DOCUMENTS

| JP | 11-321332 A | 11/1999 |
|---|---|---|
| JP | 2001-88556 A | 4/2001 |
| JP | 2013-169844 A | 9/2013 |
| KR | 10-2011-0062265 A | 6/2011 |

* cited by examiner

<CLOSED POSITION>

<POP-UP STATE>

ELECTRIC POWER TRANSMISSION APPARATUS OF SUNROOF FOR VEHICLE

CROSS-REFERENCE TO RELATED APPLICATIONS

The present application claims priority to Korean Patent Application No. 10-2015-0094836, filed Jul. 2, 2015, the entire contents of which is incorporated herein for all purposes by this reference.

BACKGROUND OF THE INVENTION

Field of the Invention

The present invention relates to an electric power transmission apparatus of a sunroof for a vehicle, in which an electric generator such as a solar cell is mounted on a moving glass of the sunroof, and electricity generated by the solar cell (or other electric generators) may be transmitted to a battery in a vehicle body or other electric devices, and more particularly, to an electric power transmission apparatus of a sunroof for a vehicle, which is capable of transmitting generated electricity even when the moving glass is in an opened position as well as a closed position, and capable of inhibiting the occurrence of a spark when electricity is conducted after the moving glass slides.

Description of Related Art

A sunroof is sometimes selectively installed in a roof panel of a vehicle in order to discharge air in the vehicle to the outside or allow outside air to flow into the vehicle, and the sunroof is configured to open and close an opening formed in the roof panel by rotating upward and downward or sliding forward and rearward.

Various types of sunroofs for a vehicle are developed and sold, and among others, recently, a panoramic sunroof, in which most of the roof panel of the vehicle is manufactured using glass and a part of the roof panel is selectively opened and closed, is being widely released on the market for the purpose of providing clear openness and excellent aesthetic design.

The panoramic sunroof is manufactured to ventilate the interior of the vehicle and allow openness, and manufactured through a heat treatment process so as to withstand intense sunlight. The sunroof may be made of glass that effectively blocks ultraviolet rays and infrared rays, or may be made of a high strength material in order to prevent an occupant from being injured due to glass fragments at the time of a vehicle accident.

Meanwhile, recently, in order to solve problems of exhaustion of fossil fuel due to limited energy resources and to minimize air pollution, researches for using solar energy as an auxiliary power source for a vehicle are being actively conducted, and actually, in the case of some hybrid electric vehicles, electric vehicles (EV), or high-grade vehicles, a solar cell mounted in the form of a panel on the roof panel of a vehicle body is released on the market.

However, there is a problem in that an electric power transmission apparatus of the sunroof for a vehicle in the related art in which the solar cell is mounted on a moving glass extremely restricts movement of the moving glass.

That is, the moving glass opens and closes the opening by freely sliding in a forward and rearward direction of the roof panel of the vehicle, but the electric power transmission apparatus of the sunroof for a vehicle in the related art cannot perfectly accommodate the movement of the moving glass, and as a result, there is a problem in that the solar cell cannot be utilized 100%, or the movement of the moving glass needs to be restricted in order to fully utilize the solar cell.

In addition, most of the research regarding the sunroof for a vehicle in the related art, which uses the solar cell, is conducted on a solar cell panel itself, that is, materials, properties, and arrangement of the solar cells, but research about the electric power transmission apparatus of the sunroof is very inadequate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an electric power transmission apparatus of a sunroof for a vehicle, which is capable of efficiently transmitting electricity generated by a solar cell without restricting sliding movement of a moving glass, and capable of preventing the occurrence of a spark when electricity is conducted.

According to various aspects of the present invention, an electric power transmission apparatus of a sunroof for a vehicle may include a moving glass mounted with an electric generator, and configured to slide between an opened position and a closed position, an upper electric conduction device coupled at a lower side of the moving glass, and including a moving spring that is electrically connected with the electric generator and coupled to protrude downward, a front electric conduction device including a front support portion that is a nonconductor, and a close spring that comes into contact with the moving spring when the moving glass moves to the closed position, and a rear electric conduction device including a rear support portion that is a nonconductor, and an open spring that comes into contact with the moving spring when the moving glass moves to the opened position, in which when the moving glass slides between the opened position and the closed position, the moving spring may be earthed while coming into line-to-line contact with the front support portion or the rear support portion, and then may come into contact with the close spring or the open spring so that electricity is conducted.

The moving spring may include a coupling portion fitted into a groove formed in a moving support portion that is a nonconductor, a bent portion extending from a front end of the coupling portion and curved downward at a predetermined angle, and an end portion curved upward at an end of the bent portion, and the angle formed between the coupling portion and the bent portion may be an acute angle (preferably, 30° or more and 90° or less in a state in which the moving spring is not elastically deformed).

The moving glass may be configured to move from the closed position to the opened position after moving upward at a predetermined height, and when the moving glass is in the closed position, the close spring may be elastically deformed by being pressed downward by the moving spring and may be in contact with the moving spring so that the contact between the moving spring and the close spring is maintained even though the moving glass moves upward.

The close spring may be formed in a bent shape so that a first end of the close spring is in contact with the moving spring, and a second end of the close spring is not in contact with the moving spring but fixed to the front support portion.

The end portion of the moving spring may come into contact with the open spring when the moving glass is in the opened position, and an anti-withdrawal portion may be formed to protrude from the rear support portion to prevent rearward movement of the end portion.

According to the present invention having the aforementioned configurations, electricity is conducted regardless of whether the moving glass is opened or not, and electricity is conducted after the moving spring is earthed while coming into line-to-line contact with the nonconductor, thereby inhibiting the occurrence of a spark when the moving spring comes into contact with the close spring or the open spring.

Since the moving spring has a shape bent at a predetermined angle, and is elastically compressed in the closed position, electricity may be conducted even though the moving glass moves to a pop-up position, and since the anti-withdrawal portion protrudes from the rear support portion, it is possible to prevent the moving spring from being withdrawn after the moving glass is moved to the opened position.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
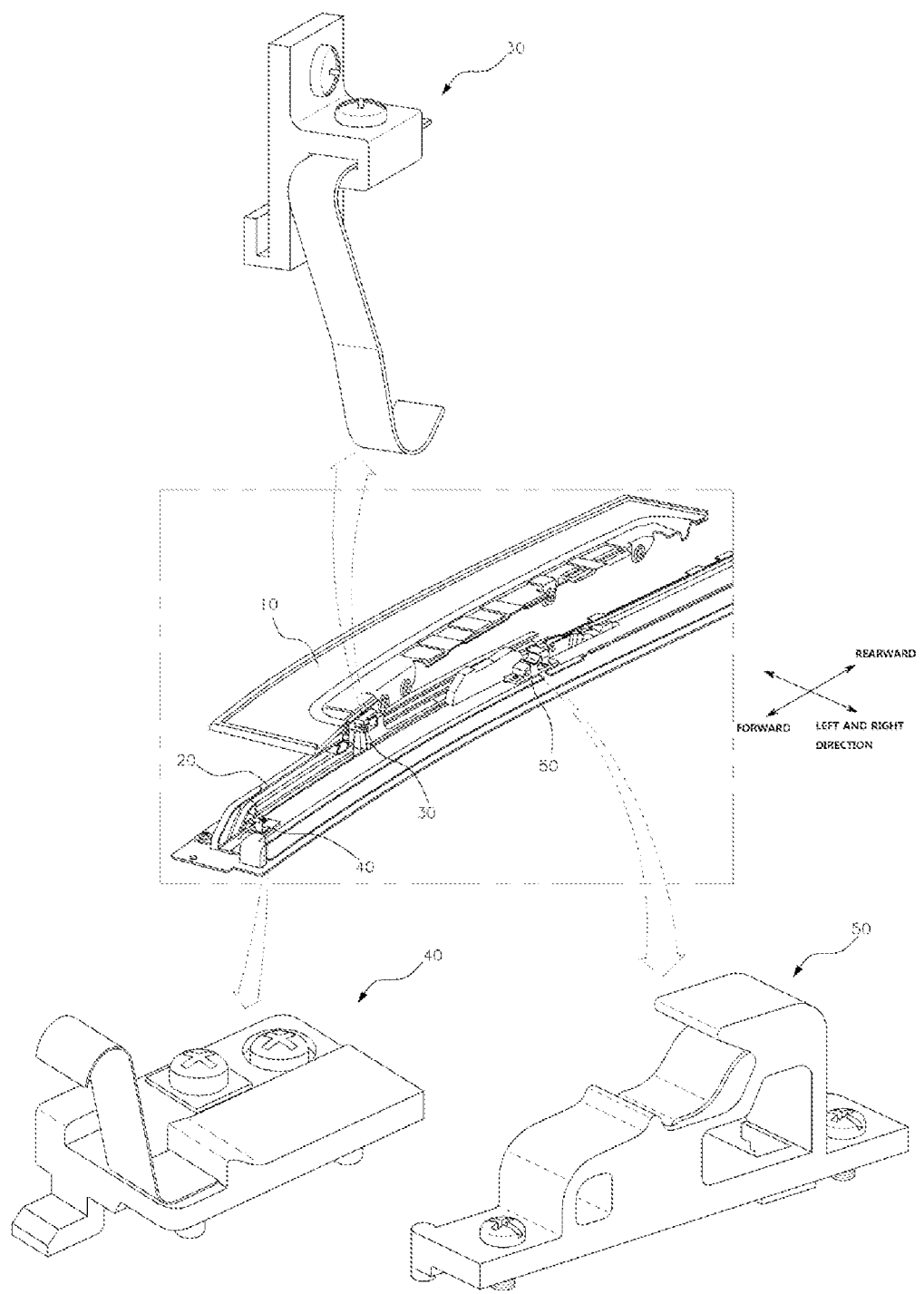
FIG. 1 is a view illustrating a state in which an upper electric conduction device is mounted at a moving glass, and a front electric conduction device and a rear electric conduction device are mounted at front and rear sides of a rail along which the moving glass slides, respectively, in accordance with the present invention, and a state in which the upper electric conduction device, the front electric conduction device, and the rear electric conduction device are enlarged.

Referring to FIG. 1, in an electric power transmission apparatus of a sunroof for a vehicle according to the present invention, an upper electric conduction device 30 is mounted on a moving glass 10 which is equipped with a solar cell (or other electric generators), a front electric conduction device 40 is mounted at a relatively front side of a rail 20 along which the moving glass 10 slides, and a rear electric conduction device 50 is mounted at a relatively rear side of the rail 20. Therefore, the upper electric conduction device 30 is electrically connected with the front electric conduction device 40 or the rear electric conduction device 50 in accordance with a sliding position of the moving glass 10.

A position where the upper electric conduction device 30 and the front electric conduction device 40 are electrically connected with each other is a position where the moving glass 10 is completely closed, and a position where the upper electric conduction device 30 and the rear electric conduction device 50 are electrically connected with each other is a position where the moving glass 10 is completely opened. The upper electric conduction device 30 is coupled to protrude toward a lower side of the moving glass 10, and the front electric conduction device 40 and the rear electric conduction device 50 are coupled to protrude toward an upper side of the rail 20, such that a moving spring 31 (31a, 31b, and 31c) of the upper electric conduction device 30 comes into contact with one of a close spring 41 of the front electric conduction device 40 and an open spring 51 of the rear electric conduction device 50 so that electricity is conducted.

Figure 2:
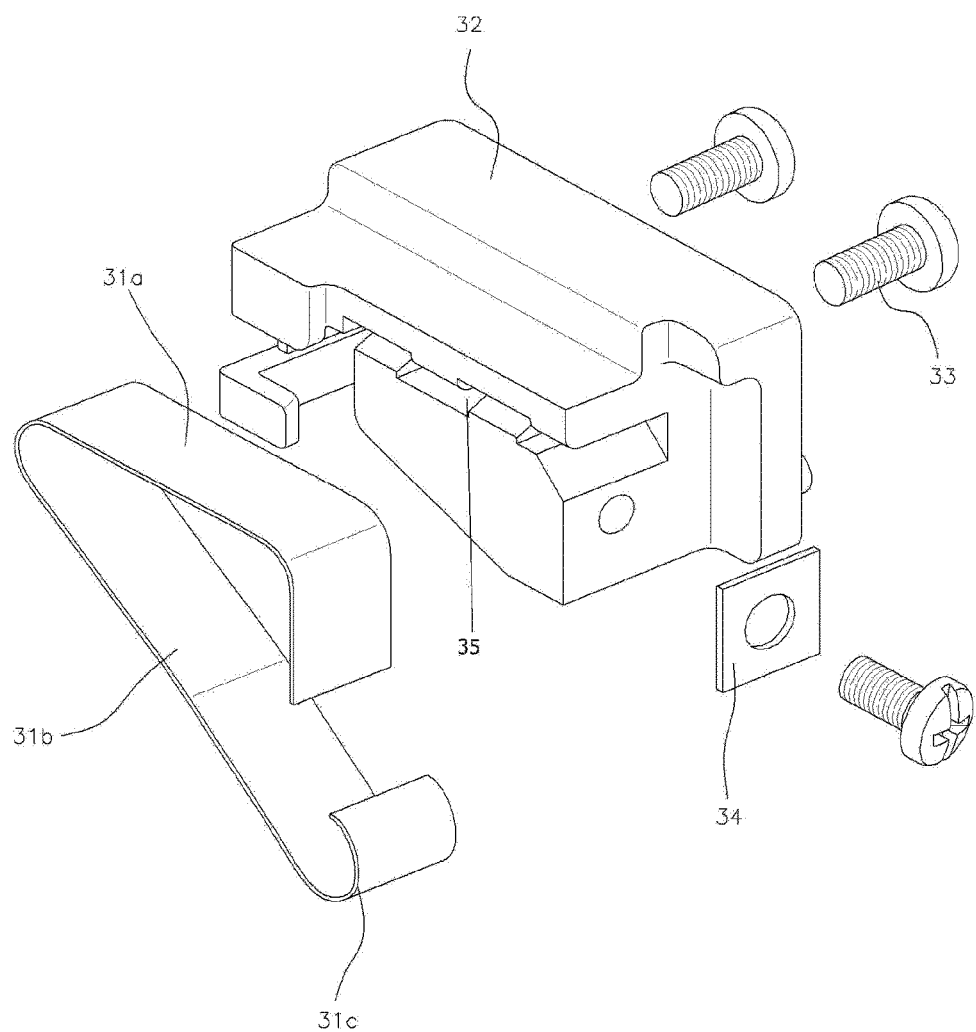
FIG. 2 is a perspective view illustrating a state in which the upper electric conduction device according to the present invention is disassembled.

Referring to FIG. 2, the moving spring 31 includes a coupling portion 31a which is fitted into a groove 35 formed in a moving support portion 32 manufactured as a nonconductor, a bent portion 31b which extends from a front end of the coupling portion 31a and is curved downward at a predetermined angle, and an end portion 31c which is formed to be curved upward at an end of the bent portion 31b. Further, the angle formed between the coupling portion 31a and the bent portion 31b is 90° or less. The moving spring 31 is fixedly fastened to the moving support portion 32 by means of bolts 33 and washers 34.

Figure 7A:
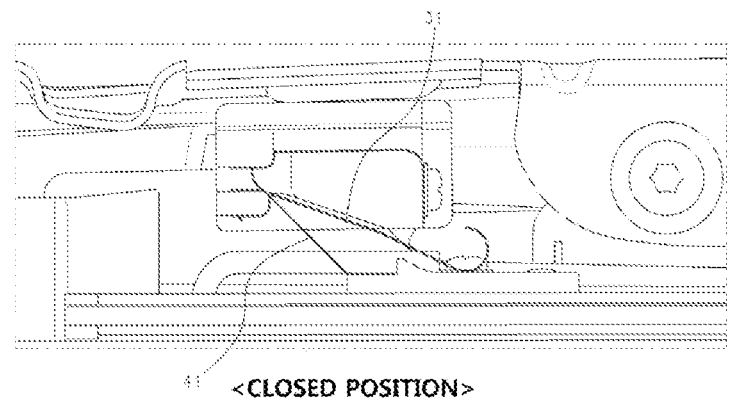
FIG. 7A, FIG. 7B, and FIG. 7C are views illustrating a state in which the moving spring moves elastically in accordance with a position of the moving glass.
Figure 7B:
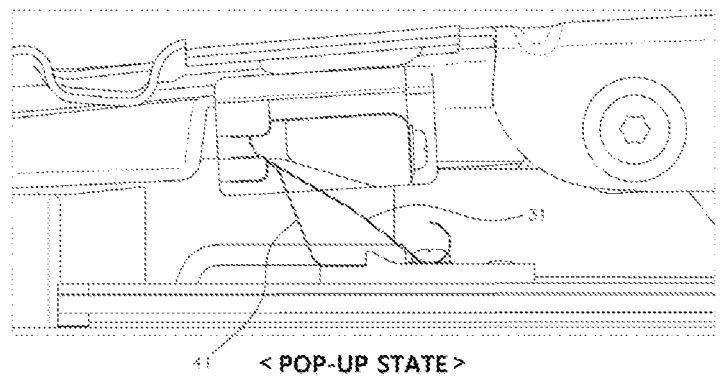
Figure 7C:
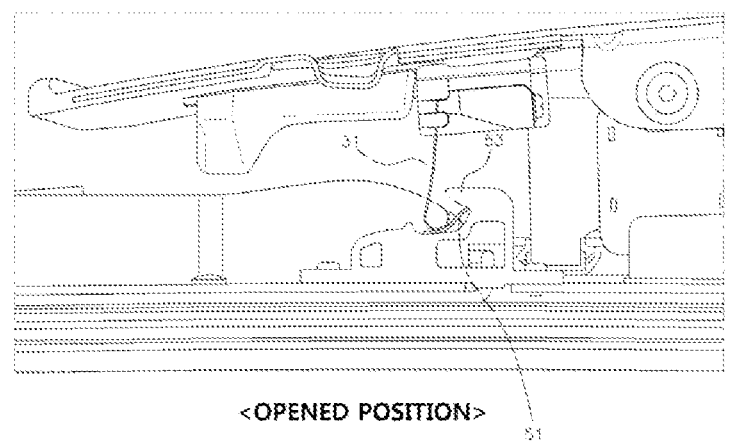

The moving glass 10 is configured to move from a closed position to an opened position after moving upward (popping up) by a predetermined height (like a sliding structure of a typical panoramic sunroof) (see FIG. 7A, FIG. 7B, and FIG. 7C). When the moving glass 30 is in the closed position, the moving spring 31 is elastically deformed by being pressed downward and is in contact with the close spring 41 so that the contact between the moving spring 31 and the close spring 31 is maintained even though the moving glass 10 moves upward.

Figure 3:
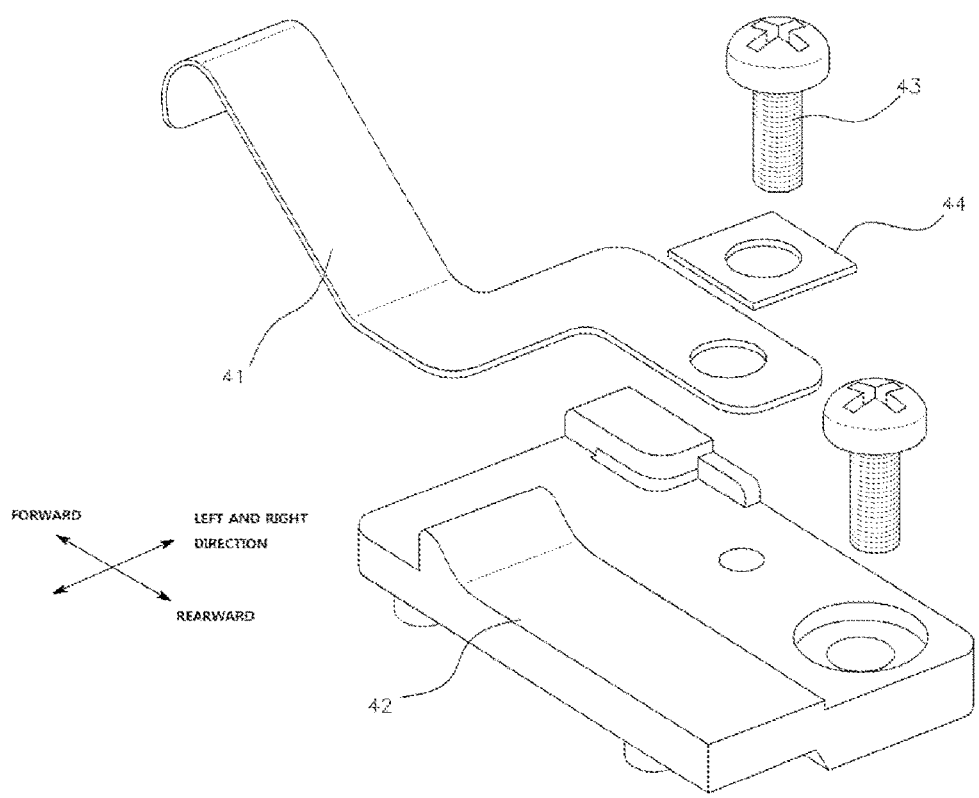
FIG. 3 is a perspective view illustrating a state in which the front electric conduction device according to the present invention is disassembled.
Figure 4:
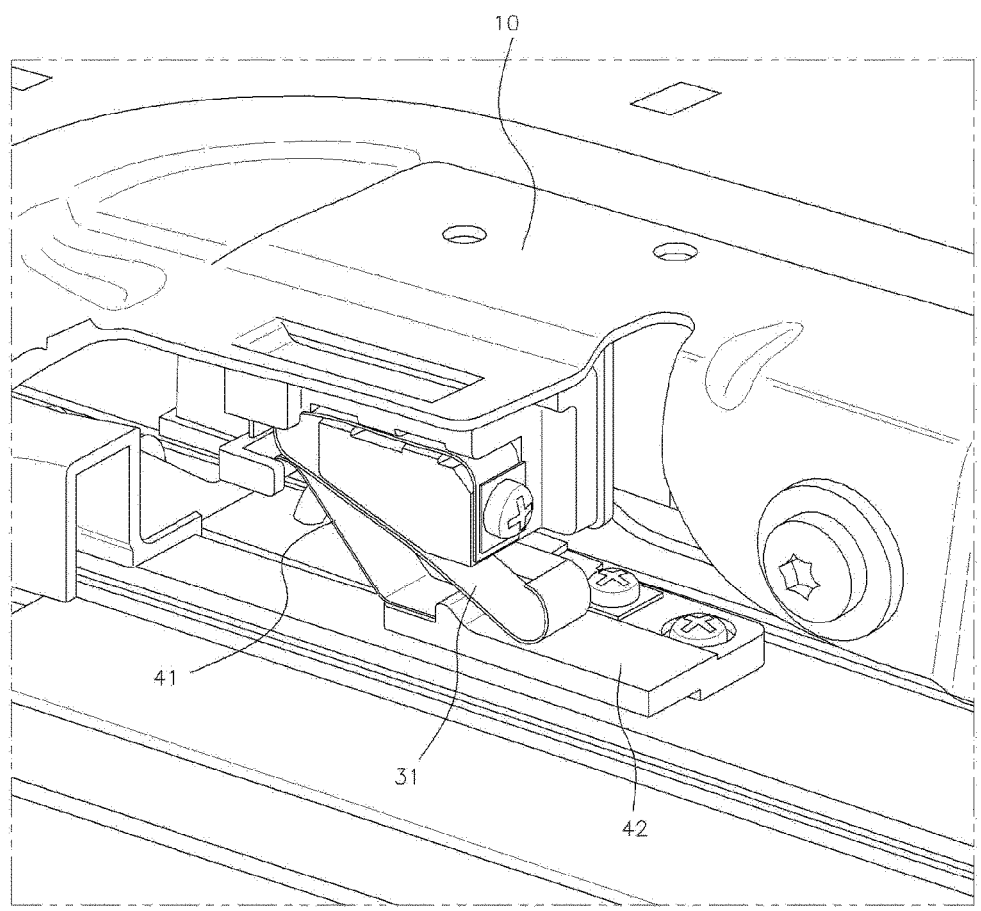
FIG. 4 is a view illustrating a state in which a moving spring of the upper electric conduction device and a close spring of the front electric conduction device are in contact with each other when the moving glass is in a closed position.

Further, as illustrated in FIG. 3, the close spring 41 is formed in a shape that is bent (in a left and right direction perpendicular to a sliding direction of the moving glass) so that one end of the close spring 41 is in contact with the moving spring 31, and the other end of the close spring 41 is not in contact with the moving spring 31 but fixed to a front support portion 42. That is, the close spring 41 is fixed by bolts 43 and washers 44, and formed to have a shape that is bent in the left and right direction so that the bolt 43 or the washer 44 is in line-to-line contact with the moving spring 31 to prevent the occurrence of a spark.

The front support portion 42 of the front electric conduction device 40 is also manufactured as a nonconductor that does not conduct electricity. The front support portion 42 may be formed of polyamide-based engineering plastic such as PA6 and/or PA66, and is configured to come into line-to-line contact with the moving spring 31 before the moving spring 31 comes into contact with the close spring 41.

Figure 5:
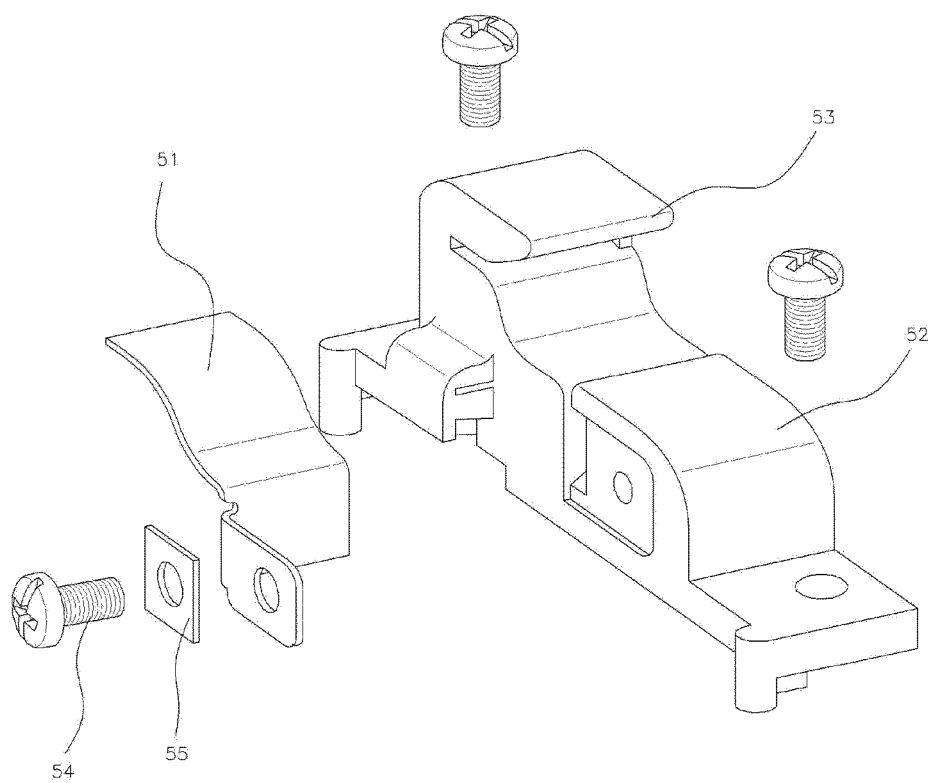
FIG. 5 is a perspective view illustrating a state in which the rear electric conduction device according to the present invention is disassembled.
Figure 6:
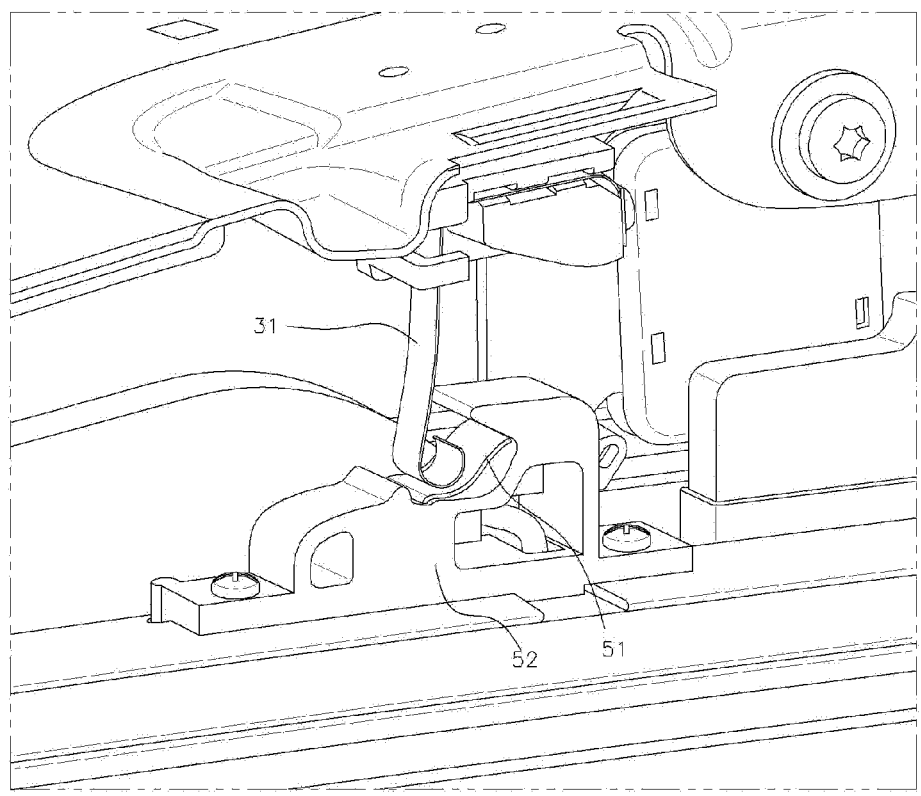
FIG. 6 is a view illustrating a state in which the moving spring of the upper electric conduction device and an open spring of the rear electric conduction device are in contact with each other when the moving glass is in an opened position.

Furthermore, as illustrated in FIG. 5, the rear electric conduction device 50 is configured such that the open spring 51, which comes into contact with the moving spring 31 when the moving glass 10 has moved to the opened position, is coupled to a rear support portion 52 which is manufactured as a nonconductor, and the open spring 51 is fixed to the rear support portion 52 by bolts 54 and washers 55.

The rear support portion 52 may also be formed of polyamide-based engineering plastic such as PA6 and/or PA66, and is disposed such that a front end of the rear support portion 52 is disposed further forward than the open spring 51 so as to come into line-to-line contact with the moving spring 31 before the moving spring 31 comes into contact with the open spring 51.

Further, an anti-withdrawal portion 53, which prevents the rearward movement of the end portion 31c, is formed to protrude from the rear support portion 52 so that the end portion 31c of the moving spring 31 is withdrawn from the open spring 51 when the moving glass 10 is in the opened position.

Therefore, when the moving glass 10 slides between the opened position and the closed position, the moving spring 31 is earthed while coming into line-to-line contact with the front support portion 42 or the rear support portion 52, and then comes into contact with the close spring 41 or the open spring 51 so that electricity is conducted.

For reference, the moving spring 31, the close spring 41, and the open spring 51 according to various embodiments of the present invention may be formed of beryllium copper having excellent corrosion resistance, wear resistance, spring properties, and electrical conductivity, and the close spring 41 and the open spring 51 may be connected to charge a battery, or wired so that electricity may be supplied directly to a body control module (BCM), a blower fan, and the like, which requires electricity in a vehicle body, without passing through the battery.

According to the electric power transmission apparatus of the sunroof for a vehicle according to the present invention as described above, electricity is conducted in a state in which the moving spring 31 is in line-to-line contact with the front support portion 42 and the rear support portion 52 which are nonconductors, thereby preventing the occurrence of a spark, and the end portion 31c of the moving spring 31 has a shape that is arcuately curved, and as a result, the moving spring may come into contact with the front support portion 42 and the rear support portion 52 without causing interference (in a state in which the moving spring is easily and elastically deformed).

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electric power transmission apparatus of a sunroof for a vehicle, the electric power transmission apparatus comprising:
    a moving glass mounted with an electric generator, and configured to slide between an opened position and a closed position;
    an upper electric conduction device coupled at a lower side of the moving glass, and including a moving spring that is electrically connected with the electric generator and coupled to protrude downward;
    a front electric conduction device including a front support portion that is a nonconductor, and a close spring that comes into contact with the moving spring when the moving glass moves to the closed position; and
    a rear electric conduction device including a rear support portion that is a nonconductor, and an open spring that comes into contact with the moving spring when the moving glass moves to the opened position,
    wherein when the moving glass slides between the opened position and the closed position, the moving spring is earthed while coming into line-to-line contact with the front support portion or the rear support portion, and then comes into contact with the close spring or the open spring so that electricity is conducted.

2. The electric power transmission apparatus of claim 1, wherein the moving spring includes:
    a coupling portion fitted into a groove formed in a moving support portion that is a nonconductor;
    a bent portion extending from a front end of the coupling portion and curved downward at a predetermined angle; and an end portion curved upward at an end of the bent portion, and wherein the angle formed between the coupling portion and the bent portion is an acute angle.

3. The electric power transmission apparatus of claim 2, wherein the moving glass is configured to move from the closed position to the opened position after moving upward at a predetermined height, and when the moving glass is in the closed position, the close spring is elastically deformed by being pressed downward by the moving spring and is in contact with the moving spring so that the contact between the moving spring and the close spring is maintained even though the moving glass moves upward.

4. The electric power transmission apparatus of claim 3, wherein the close spring is formed in a bent shape so that a first end of the close spring is in contact with the moving spring, and a second end of the close spring is not in contact with the moving spring but fixed to the front support portion.

5. The electric power transmission apparatus of claim 3, wherein the end portion of the moving spring comes into contact with the open spring when the moving glass is in the opened position, and an anti-withdrawal portion is formed to protrude from the rear support portion to prevent rearward movement of the end portion.

6. The electric power transmission apparatus of claim 4, wherein the end portion of the moving spring comes into contact with the open spring when the moving glass is in the opened position, and an anti-withdrawal portion is formed to protrude from the rear support portion to prevent rearward movement of the end portion.

\* \* \* \* \*